Sept. 10, 1935. W. NELSON 2,013,666
SEALED SEAM FOR METAL STRUCTURES
Filed Nov. 14, 1933 2 Sheets-Sheet 1

WILLIAM NELSON
INVENTOR

BY Harold Dodd,
ATTORNEY

Sept. 10, 1935.  W. NELSON  2,013,666
SEALED SEAM FOR METAL STRUCTURES
Filed Nov. 14, 1933   2 Sheets-Sheet 2

WILLIAM NELSON
INVENTOR

BY Harold Dodd
ATTORNEY

Patented Sept. 10, 1935

2,013,666

UNITED STATES PATENT OFFICE 2,013,666

SEALED SEAM FOR METAL STRUCTURES

William Nelson, United States Navy

Application November 14, 1933, Serial No. 697,942

6 Claims. (Cl. 220—75)

(Granted under the act of March 3, 1883, as amended April 30, 1928; 370 O. G. 757)

My invention relates to an improved tightly sealed joint in riveted, bolted or otherwise secured structures; and more particularly to means for effecting leak-proof sealed joints for fuel tanks, oil tanks, floats and the like, to prevent leakage not only past the securing member but around the securing member.

A principal object of my invention is to provide resilient sealing members for structural joints, and to utilize this resiliency in a novel manner.

Another object is to provide a sealed joint or seam for structures that will dispense with the use of paints, varnishes and other soft or plastic sealing compounds inserted between the plates and thereby produce a structure that is rugged, light in weight, and one that will withstand severe service demands, including heavy vibration.

With the above and other objects in view, the invention consists in the construction, combination and arrangement of parts as will be described more fully hereinafter.

Reference is to be had to the accompanying drawings forming a part of the specification, in which like reference characters indicate corresponding parts throughout the several views, and in which.

Figure 2:
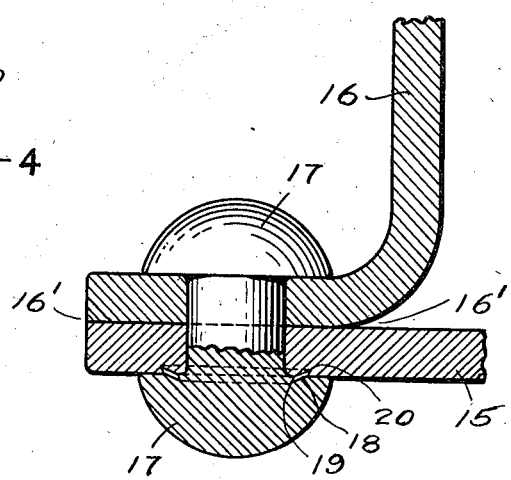
Fig. 2 is an enlarged vertical section taken on the line 2—2 of Fig. 1.
Figure 4:
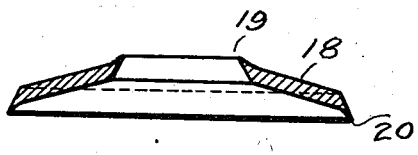
Fig. 4 is a vertical section taken on line 4—4 of Fig. 3.

Referring more particularly to the drawings, 15 indicates a portion of a tank, or other structure, to which is secured the flanged end plate 16, by means of a series of closely spaced rivets, or the like, 17. The sealing of the joints against leakage around the securing members as well as past the securing members is accomplished by means of members 18, each shaped in the form of the frustum of a hollow cone preferably made of spring metal, located beneath the heads of securing members 17, so that the sharply cut corners 19 and 20 are forced into the softer surrounding metal when heading up the rivets or, generally, when setting up the securing means. The faces terminating in corners 19 and 20 are so made that when member 18 is flattened out, as shown in Fig. 2, the corners project into the head of the securing means and the metal of the structure, respectively. In the assembly section shown in Fig. 2, the joint 16' is also sealed by the action of spring 18 which exerts a force to hold the member 16 against the member 15, thereby preventing leakage along the contact surface 16', as well as around the securing member 17.

The sealing of the joint against leakage past the securing means and along the contact surface is also accomplished by placing, preferably in addition to the circular spring sealing members 18, an elongated strip spring sealing member 21 between the structural members 16, as close to the shank of the securing member 17 as possible. This member 21 is similar in cross section to the circular member 18 and is provided with the sharply cut corners 23 and 24 that bite into the metal of the structure to produce a seal when the securing members 17 are set up.

It is to be noted that when the member 21 is under compression through the action of securing member 17, three effects are produced. First, the sealing member 21 bites into the substance of structural members 15 and 16, penetrating the metal, upsetting it, deforming it and displacing it, forcing it against the adjacent structural part, thereby effecting a seal. Second, the member 21 becomes, itself, a seal; for its opposite edges 23 and 24 are firmly and tightly imbedded in the adjacent structure, and the body of member 21 is interposed across the contact surface 16', thereby effecting a seal. Third, the member 21 is itself compressed and deformed, and, being of resilient material, it forceably tends to resume its normal shape thereby forcing the opposite edges 23 and 24 into the adjacent structure more tightly and firmly than ever, thus increasing the efficiency of the seal, not only under static conditions, but, more particularly, under dynamic conditions of vibration or other relative movements of parts which would break the seal but for the resilient self-adjustment of the member 21.

The same reasoning applies to the member 18, but this member, because of its location, as well as its elasticity, performs the additional function of increasing the sealing effect at a point remote from the member 18, namely at the contact surface 16', as heretofore described.

Figure 1:
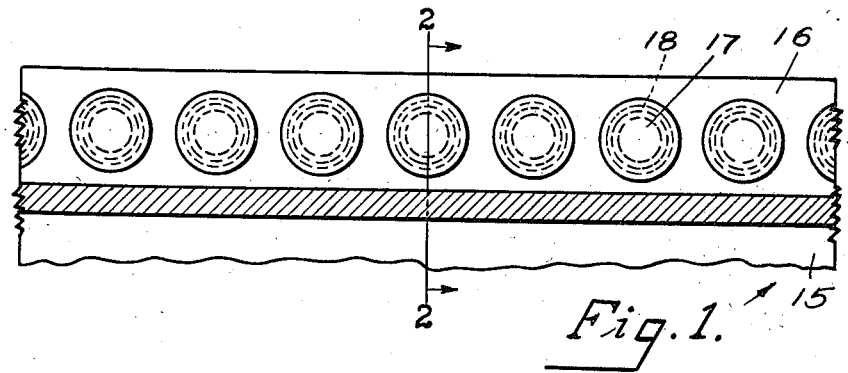
Fig. 1 is a fragmentary plan view of a riveted joint incorporating my spring sealing member therein.
Figure 5:
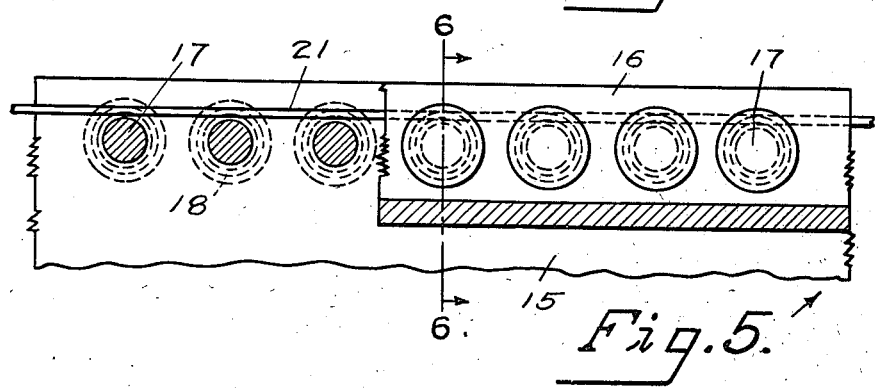
Fig. 5 is a fragmentary plan view of a riveted joint showing a modified use of my spring sealing members.
Figure 9:
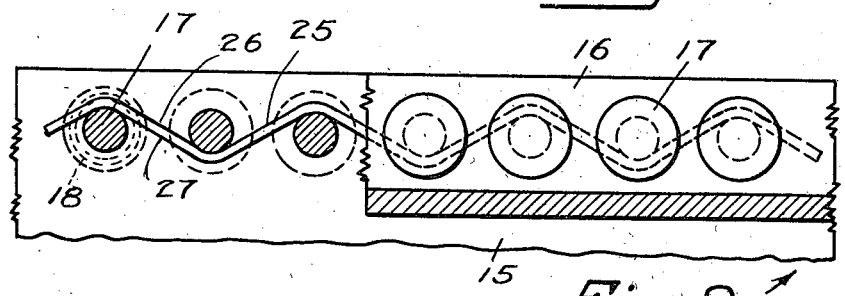
Fig. 9 is a fragmentary view of a riveted joint incorporating a further arrangement of my spring sealing members.

As a further precaution against leakage where the material used in the construction of the structural parts is very thin and/or soft, I dispose my spring sealing member in a series of zigzag curves so as to permit the same to be assembled as shown in Fig. 9. In this construction I provide a spring metal member 25, similar in cross section to the other forms of my sealing members including the sharply cut corners 26 and 27 for cutting into the metal of the structure.

Figure 10:
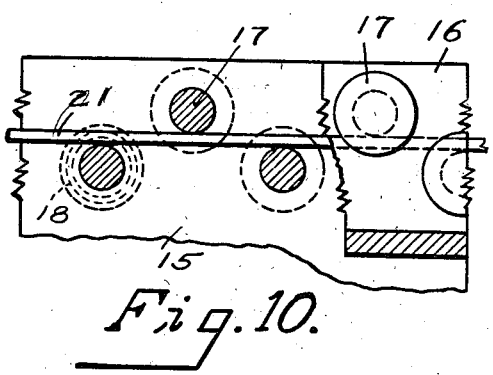
Fig. 10 is a still further arrangement in which a straight spring sealing member, as shown in Fig. 7, is located between a staggered row of rivets.
Figure 7:
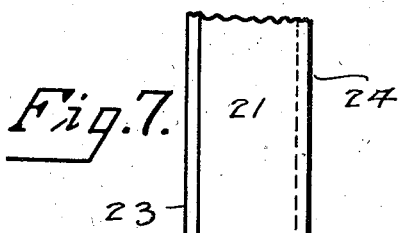
Fig. 7 is a detail plan view of one form of my spring sealing member.
Figure 6:
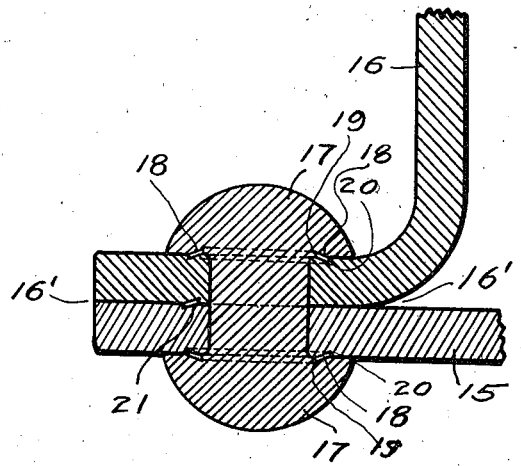
Fig. 6 is an enlarged vertical section taken on line 6—6 of Fig. 5.
Figure 8:
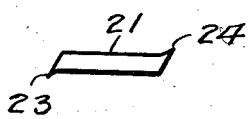
Fig. 8 is an end view of the spring sealing member shown in Fig. 7.

I may arrange, as shown in Fig. 10, a joint formed between the members 15 and 16, which is provided with a double row of staggered securing members 17 having an elongated spring sealing member 21 as shown in Fig. 7 placed between the rows.

Figure 11:
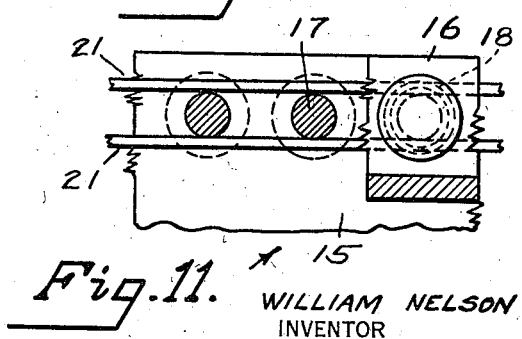
Fig. 11 shows a modification in which a straight spring sealing member is placed on both sides of a row of rivets.
Figure 3:
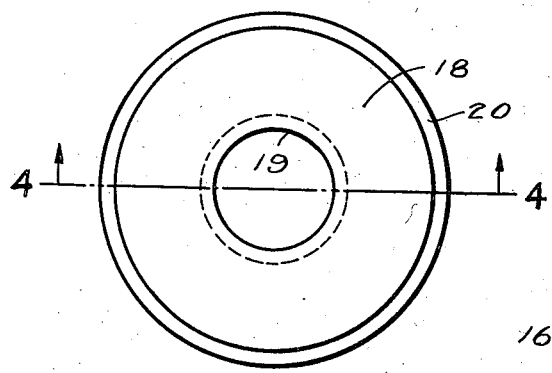
Fig. 3 is an enlarged plan view of one of the spring sealing members.

In a still further modified arrangement of my spring sealing members when applied to containers where very high internal pressures are desired, I propose to place my elongated spring sealing member 21 along both sides of a single row of securing members 17, as shown in Fig. 11.

The material used for the spring sealing member is preferably harder than the structural material or the material of the securing members, so that when the joint is made, the spring sealing member digs into the softer material and thereby seals the joint. Due to the manner in which the spring sealing members are formed, they stay in compression after assembly so that any loosening caused by vibration or by failure to seat the rivet properly does not result in the breaking of the seal.

While I have shown a number of modifications in which I propose to place my elongated spring sealing members between the joints as an alternative to my circular spring sealing members placed around the securing members, I contemplate incorporating both the circular members 18, and the elongated strip member 21, in all of the arrangements shown, when desired.

It will be understood that the above description and accompanying drawings comprehend only the general and preferred embodiment of my invention, and that various changes in the construction, proportions and arrangement of parts may be made within the scope of the appended claims, without sacrificing any of the advantages of this invention.

The herein described invention may be manufactured and used by or for the Government of the United States for governmental purposes without the payment of any royalties thereon.

What I claim is:

1. A leak proof structural joint comprising adjacent structural members, a securing member forcing said structural members together, a resilient sealing member compressed between said structural members by the action of said securing member to penetrate the substance of said structural members thereby preventing leakage past said sealing member, and to maintain the seal by its own resilient reaction.

2. A sealing member for structural joints, said sealing member being of hard resilient material having a parallelogram-shaped cross section and being further characterized by the fact that diagonally opposite longitudinal edges of said member protrude beyond the boundary of said parallelogram.

3. A structural joint comprising adjacent structural members, a securing member forcing said members together, a sealing member of resilient material harder than that of said structural members disposed between said structural members, said sealing member having oppositely protruding edges so formed that under the action of said securing member said edges penetrate the substance of said structural members and said sealing member is subjected to a torsional stress.

4. A structural joint comprising adjacent structural members, a securing member forcing said structural members together, a sealing member of harder material than said other members, said sealing member having sharply cut oppositely disposed corners, and disposed between said securing member and a structural member and forced into the substance of said securing member and said last mentioned structural member by the action of said securing member, to effect the seal through deformation of said securing member and said last mentioned structural member.

5. A structural joint comprising adjacent structural members, a plurality of securing members forcing said structural members together, a sealing member in the form of a strip of hard resilient material disposed between said structural members and adjacent said securing members and forced into the substance of said structural members by the action of said securing members.

6. A structural joint comprising adjacent structural members, a plurality of securing members forcing said structural members together, a sealing member in the form of a strip of hard resilient material disposed between said structural members and adjacent said securing members and forced into the substance of said structural members by the action of said securing members to effect the seal through deformation of the substance of said structural members, and to maintain the seal through its own resilient reaction.

WILLIAM NELSON.